Dec. 1, 1953   E. F. BRITTEN III   2,660,847
GRASS TRIMMER AND EDGER
Filed June 24, 1950   2 Sheets-Sheet 1
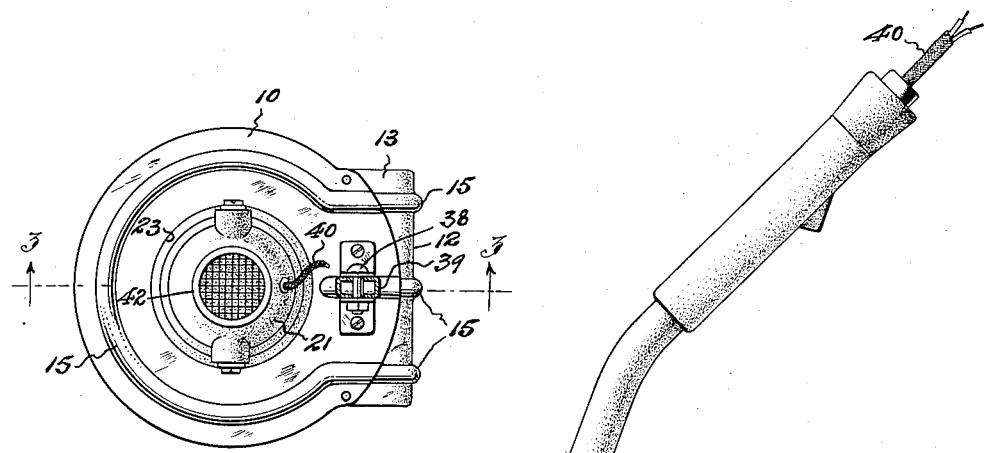
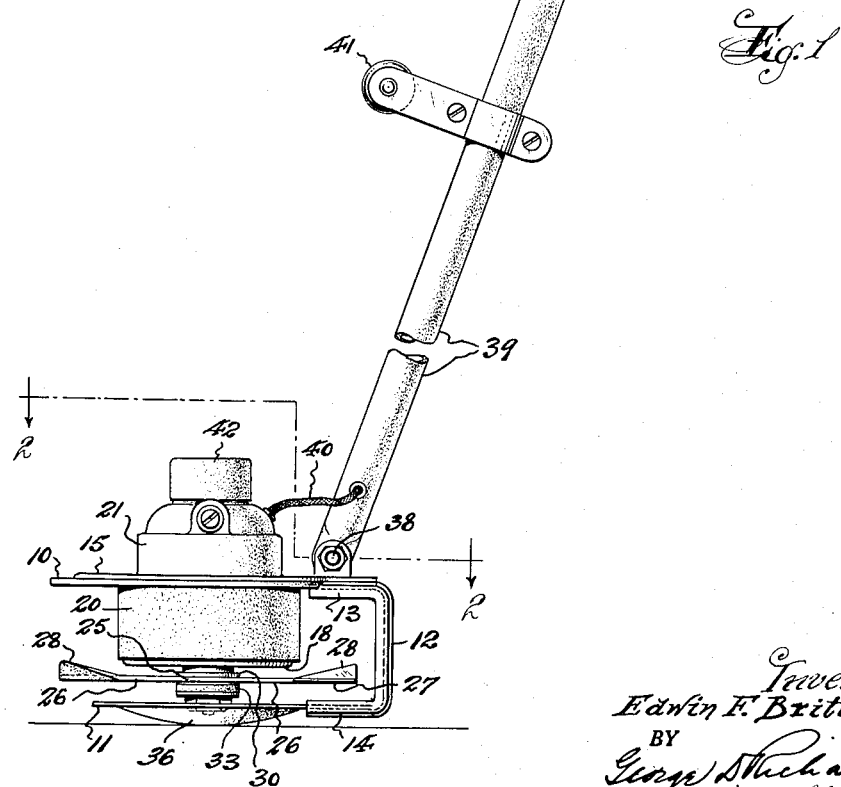
Inventor:
Edwin F. Britten III,
BY
George S. Richards
Attorney.

Dec. 1, 1953                E. F. BRITTEN III                 2,660,847
                          GRASS TRIMMER AND EDGER
Filed June 24, 1950                                         2 Sheets-Sheet 2

Inventor:
Edwin F. Britten III,
BY
George D. Richards
Attorney.

Patented Dec. 1, 1953

2,660,847

UNITED STATES PATENT OFFICE 2,660,847

GRASS TRIMMER AND EDGER

Edwin F. Britten III, Short Hills, N. J.

Application June 24, 1950, Serial No. 170,131

2 Claims. (Cl. 56—25.4)

This invention relates to improvements in apparatus for cutting grass, and has reference, more particularly, to apparatus which is especially adapted for use in trimming grass along the borders of lawns, along adjacent walls and curbs, around monuments, and in other areas which are not accessible by ordinary lawn mower devices.

This invention has for an object to provide a grass trimmer and edger device comprising a carriage frame including a manipulating handle member therefor, power driven rotary cutting blade means supported by the carriage frame, and novel means for so mounting the blade driving power unit in connection with the carriage frame that said power unit is resiliently supported in such manner that shocks, due to accidental striking of obstructions by the blade means during operation of the device, will be substantially absorbed by the mounting, thus substantially eliminating risk of injury to the power unit from such cause, and at the same time also avoiding transmission of uncomfortable vibration from the operating power unit and cutting blade means to the manipulating handle member of the device.

The invention has for a further object to provide a grass trimmer and edger device characterized as above stated wherein the blade driving power unit comprises an electric motor which is supported in connection with the carriage frame by a resilient rubber mounting which thus additionally serves to electrically insulate the motor from the carriage frame and its manipulating handle member, thereby substantially avoiding risk of accidental electrical shock to the operator of the device.

Another object of this invention is to provide a grass trimmer and edger device wherein the power unit for driving the cutting blade means comprises an electric motor, and means for air cooling said motor including an air filtering intake means, air circulating means, and air discharge means surrounding said motor and so arranged as to cause upward and outward flow of discharged air whereby flying dirt and cut grass is deflected away from the air filtering intake means, thus avoiding obstruction of the latter by accumulation of dirt and cut grass.

The above stated and other objects and advantages of this invention will become evident from the following detailed description of the invention, reference being had to the accompanying drawings which show illustrative embodiments thereof; it being understood that changes and modifications may be made within the scope of the invention as defined by the claims appended to said description.

In the drawings:

Fig. 1 is a side elevational view of a grass trimmer and edger device made according to this invention; Fig. 2 is a top plan view of the same in part section, taken on line 2—2 in Fig. 1.

Similar characters of reference are employed in the above described views, to indicate corresponding parts.

Figure 3:
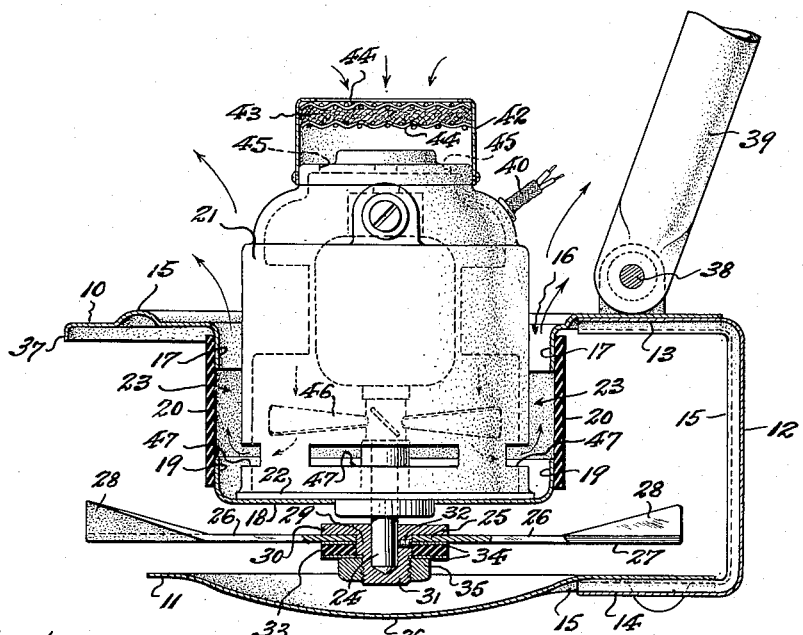
Fig. 3 is a vertical longitudinal sectional view, taken on line 3—3 in Fig. 2, but drawn on an enlarged scale.

Referring first to Figs. 1 to 3 inclusive, the carriage frame of the grass trimmer and edger of this invention comprises an annular top plate 10, and a bottom or skid plate 11 arranged in axial alignment with said top plate 10 and spaced downwardly therefrom. Said top plate 10 and bottom or skid plate 11 are connected together at their rearward sides or ends by a U-shaped coupling bracket section 12, to the upper arm 13 of which said top plate 10 is secured by suitable fastening means, and to the lower arm 14 of which the bottom or skid plate 11 is secured by suitable fastening means.

Preferably, the top plate 10, bottom or skid plate 11 and coupling bracket section 12 comprise sheet metal stampings, and these stampings may be suitably reenforced against distortion by reenforcing ribs 15 which are suitably formed and disposed in connection therewith; thus providing a carriage frame structure of strong and durable character and yet of relatively light weight. It will be understood, however, that the carrier frame may alternatively be formed from cast metal or cast metal parts if so desired.

The top plate 10 is constructed to support a power unit by which the cutting blade means of the device is actuated; said cutting blade means being located adjacently above the bottom or skid plate 11. To this end, said top plate is provided with a centrally located, upwardly open well portion dependent therefrom within which the power unit is mounted. Said well portion includes the means by which the power unit is resiliently supported whereby to intercept transmission of shocks thereto, and to avoid transmission of vibration from the operative power unit and cutting blade means to the carriage frame and handle shaft of the device.

To provide the form of top plate well structure shown in Figs. 1 to 3 inclusive, said top plate is provided with a central opening 16 of suitable diameter, from the periphery of which extends a dependent annular flange 17. The bottom of said well structure is provided by a transverse cup 18 substantially corresponding in diameter to the diameter of the top plate opening 16; said cup having an upstanding peripheral flange 19. Extending between said cup 18 and the top plate 10 is an annular sleeve 20 made of soft rubber or equivalent resilient or elastic material, the upper end of which is affixed to the flange 17 of the top plate 10, as by riveting, vulcanizing, or otherwise fastening the same thereto. Similarly, the lower end of said resilient sleeve 20 is affixed to the flange 19 of the bottom cup 18, likewise by riveting, vulcanizing or otherwise fastening the same thereto.

The cutting blade actuating power unit, as shown, comprises an electric motor 21, the diameter of which is somewhat less than the internal diameter of the well portion of the top plate. Said motor 21 is supported by its base 22 upon the bottom cup 18, and is suitably secured to the latter so that the motor extends upwardly through the interior of the well portion and in concentric spaced relation to the sides thereof, thus providing an upwardly open annular air conducting passage 23 intermediate the sides of the motor and the sides of the well portion.

The armature shaft 24 of the motor 21 extends through the cup 18 to project toward the bottom or skid plate 11 of the carriage frame. Mounted on the thus projecting free end portion of the armature shaft 24, so as to be actuated by said shaft, is the cutting blade means of the device. In a preferred form of this cutting blade means, as shown, the same comprises a transversely extending, horizontal blade body 25 which provides oppositely extending blade arms 26, the end portions of which each terminate in sharpened cutting edge portions 27 disposed to extend along the leading side margin thereof, and in upturned, angularly pitched fan sections 28 disposed to extend along the trailing side margin thereof. The blade body 25 is coupled to the armature shaft 24 by a slip clutch coupling connection comprising a coupling collar 29 having at its upper end a flange or washer 30 unitary therewith, and which terminates at its lower end in an externally screw-threaded stud 31 of reduced diameter. Said coupling collar is affixed to the armature shaft 24 by a set screw 32. The coupling collar extends through a central opening in the blade body 25 so that the flange or washer 30 abuts the upper face of said blade body. Engaged over the coupling collar 29, to abut the under face of the blade body 25, is a rubber clutch washer 33, the opposite sides of which are faced with metallic washers or facing members 34. A nut 35 is screwed onto the stud 31, and forces the clutch washer assembly into engagement with the blade body 25, so that the latter is frictionally gripped between said assembly and the flange or washer 30. It will be obvious that the slip clutch coupling connection thus provided will couple the blade body 25 to the motor armature shaft 24 so that the cutting blade means will be operatively rotated by the latter, while nevertheless subject to rotative yielding or slip movement if the actuated cutting blade means momentarily encounters an obstruction. It will thus be understood if, during operative rotary movement of the cutting blade means, said cutting blade means momentarily encounters an obstruction, the shock of such encounter will be taken up by the yielding slip clutch coupling connection, and consequently injurious transmission of such shock to the motor 21 will be prevented.

The bottom or skid plate 11 is of a radius less than the radial extent of the arms 26 of the cutting blade means so that the effective cutting edge portions 27 of the latter project exteriorly beyond the periphery of said bottom or skid plate. The bottom or skid plate is formed with a dished or concavo-convex central skid section 36 which provides traction support for the device when the latter is in use. The cutting blade means is suitably spaced above the bottom or skid plate 11, so as to predetermine the cutting height of the cutting blade means above ground surface.

The radius of the top plate 10 exceeds the radial extent of the arms 26 of the cutting blade means, so that the periphery of said top plate serves as a fending guard, to prevent the cutting blade means from contacting walls, curbs, monument bases or the like along which the device may be moved in use. Preferably the periphery of said top plate 10 is provided with a dependent flange 37 which reenforces the same against distortion.

Pivotally connected with the rear side or end of the top plate 10, by a pivotal connection 38, is a handle shaft 39 by which the device can be manipulated in use. Preferably said handle shaft is of tubular form so that the electrically conductive cable 40, by which operating current is supplied to the motor 21, may be led downwardly therethrough, and thence outwardly therefrom for operative connection with said motor 21. To said handle shaft 39 is affixed an auxiliary hand grip means 41, which can be adjusted to any suitable selected position along the length of said handle shaft.

The motor 21 is adapted to be air cooled, and means is provided for filtering the cooling air which is circulated therethrough. To this end, a filter cap 42 is provided with an interstitial filter body 43 of metallic filaments supported between reticulate grids 44. The filter cap is detachably mounted on the upper end of the motor 21 so as to communicate with air intake openings or ports 45 with which the motor casing is provided. A suitable oil or like viscous coating is applied to the filter body filaments, whereby to facilitate separation from the cooling air of dust and solid particles and retention thereof by the filter. Mounted on the motor armature shaft 24, within the motor casing, is an air impeller fan 46, and said motor casing is provided with air discharge openings or ports 47 which communicate with the upwardly open passage 23 intermediate the motor and the sides of the well portion of the carriage frame. When the motor 21 is in operation to drive the cutting blade means of the device, the air impeller fan 46 draws atmospheric air downwardly through the air filter means and motor interior, thence discharging the air through the discharge ports or openings 47 for upward and outward flow through said passage 23. The outflow of air from the passage 23 deflects dust, solid particles and cut grass away from the filter so that obstruction of the latter by accumulation thereof is efficiently prevented.

In the operation of the cutting blade means, the fan sections 28 thereof function to cause inflow of air whereby grass to be cut is sucked and bent inwardly into the path of movement of the whirling cutting edge portions 27.

Since the motor 21, with the cutting blade means actuated thereby, is suspended from the carriage frame by the resilient rubber sleeve 20, both lateral and torsional yielding play of the motor relative to the carriage frame is permitted. This, in conjunction with the slip clutch connection of the cutting blade means with the motor shaft, prevents transmission of severe shocks to the motor armature in the event the cutting blade means accidentally strikes an obstruction, thus avoiding risk of injury to the motor armature, slipping of the motor commutator, or like occurrences which have heretofore been causes of motor break down. In addition to this, the interposition of the resilient sleeve 20 between the cutting blade actuating motor and the carriage frame provides vibration dampening means which effectively eliminates undue transmission of vibration through the carriage frame to the handle shaft of the device during operation of the latter. Said resilient sleeve 20 being electrically non-conductive also serves to insulate the motor from the carriage frame and its handle shaft, thus diminishing risk of accidental electrical shock to the operator of the device.

Figure 4:
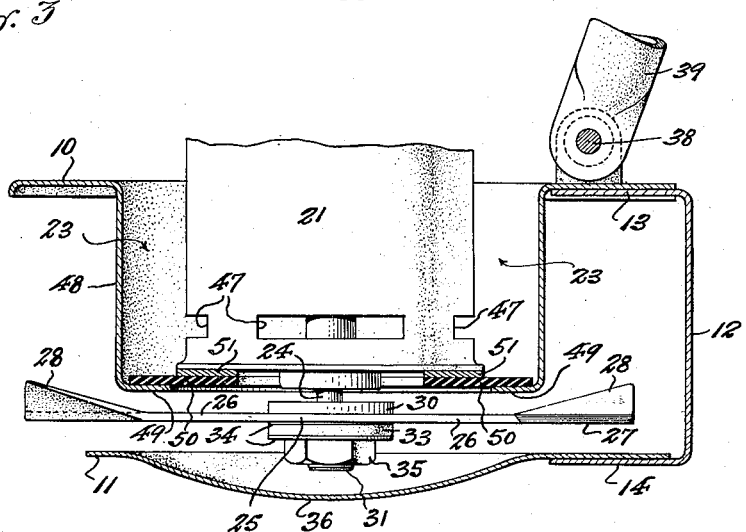
Fig. 4 is a fragmentary vertical longitudinal section, similar to that of Fig. 3, but showing a modified form and arrangement of means for resiliently mounting the blade driving motor in supported connection with the carriage frame.

Although the above described form of resilient mounting for the cutting blade actuating motor is deemed the preferred form thereof, other forms may be utilized. For example, as shown in Fig. 4, the top plate 10 of the carriage frame is provided with an integral dependent well portion 48 which terminates at its lower end in an internal annular bottom flange 49. Secured by its outer marginal portions to said bottom flange 49 is a horizontally disposed annular resilient mounting member 50 made of soft rubber or equivalent elastic material. Secured to the free inner marginal portions of the resilient mounting member 50 is an inwardly offset carrier ring 51 upon which the motor 21 is fixedly mounted. It will be obvious that the resilient mounting member 50 will support the motor subject to lateral and torsional play with shock absorbing and vibration dampening effects, and also with electrical insulating effect, within the principles and to satisfy the objects of this invention.

While the device has been shown and described as provided with an electric motor to serve as the power unit for driving the cutting blade means, it will nevertheless be understood that any other suitable type of power unit may be utilized, and supported in connection with the carriage frame by the novel resilient mounting so as to attain the desired shock absorbing and vibration dampening effects.

Having now described my invention, I claim:

1. In a grass trimmer and edger, a U-shaped carriage frame comprising a top plate and a bottom skid plate, said top plate having an upwardly open well portion dependent therefrom with its bottom end spaced above said skid plate, said well portion having impervious side and bottom walls, an electric motor having a casing affixed to the bottom of said well portion with the upper end thereof projecting outwardly above the open end of said well portion, the motor armature shaft projecting through the bottom of said well portion, a rotary cutting blade fixed on said armature shaft intermediate the bottom of said well portion and the carriage frame skid plate, the motor casing being smaller in diameter than the internal diameter of said well portion, whereby to provide an annular air conducting passage intermediate the motor casing and the side walls of said well portion to open out from the top of said well portion, said motor casing having an air intake means in its upper end and air outlet means leading from its lower interior into said air conducting passage, and an air impeller fan fixed on the motor armature shaft to be driven thereby within the lower interior of the motor casing, said fan being adapted to draw air into the motor casing through its air intake to ventilate the motor and to discharge air from said air conducting passage in an annular stream surrounding the top end of the motor and its air intake, and thus to deflect dust, solid particles, grass and the like away from the latter.

2. In a grass trimmer and edger, a U-shaped carriage frame comprising a top plate and a bottom skid plate, said top plate having an upwardly open well portion dependent therefrom formed by a bottom cup spaced above said skid plate and a rubber sleeve connected between said cup and top plate to provide said well portion with resilient impervious side walls, an electric motor having a casing affixed to the well bottom cup with the upper end thereof projecting outwardly above the open end of said well portion, the motor armature shaft projecting through said well bottom cup, a rotary cutting blade fixed on said armature shaft intermediate the well bottom cup and the carriage frame skid plate, the motor casing being smaller in diameter than the internal diameter of said well portion, whereby to provide an annular air conducting passage intermediate the motor casing and the side walls of said well portion to open out from the top to said well portion, said motor casing having an air intake means in its upper end and air outlet means leading from its lower interior into said air conducting passage, and an air impeller fan fixed on the motor armature shaft to be driven thereby within the lower interior of the motor casing, said fan being adapted to draw air into the motor casing through its top air intake to ventilate the motor and to discharge air to and from said air conducting passage in an annular stream surrounding the top end of the motor and its air intake, and thus to deflect dust, solid particles, grass and the like away from the latter.

EDWIN F. BRITTEN III.

References Cited in the file of this patent

UNITED STATES PATENTS

| Number | Name | Date |
|---|---|---|
| Re. 21,274 | Orr | Nov. 21, 1939 |
| Re. 21,289 | Orr | Dec. 5, 1939 |
| 1,805,927 | Sharp | May 19, 1931 |
| 2,130,160 | Schellenberg | Sept. 13, 1938 |
| 2,167,222 | Shelor | July 25, 1939 |
| 2,232,261 | Orr | Feb. 18, 1941 |
| 2,273,712 | Köttgen | Feb. 17, 1942 |
| 2,397,536 | Coss | Apr. 2, 1946 |
| 2,400,341 | Day et al. | May 14, 1946 |
| 2,493,788 | Turlay | Jan. 10, 1950 |